United States Patent [19]

Power et al.

[11] 3,946,137

[45] Mar. 23, 1976

[54] MACHINEABLE DECORATIVE LAMINATES

[75] Inventors: George Edward Power; Dudley Wulfekotter, both of Cincinnati, Ohio

[73] Assignee: Formica Corporation, Cincinnati, Ohio

[22] Filed: May 16, 1973

[21] Appl. No.: 360,708

[52] U.S. Cl. ............... 428/452; 428/535; 428/530
[51] Int. Cl.² ............................................ B44F 1/00
[58] Field of Search ......... 161/79, 258, 413, 6, 260, 161/265; 428/452, 535, 530

[56] References Cited
UNITED STATES PATENTS

| | | | |
|---|---|---|---|
| 2,816,851 | 12/1957 | Arledter | 161/413 |
| 3,135,643 | 6/1964 | Michl | 161/258 |
| 3,373,070 | 3/1968 | Fuerst | 161/258 |
| 3,373,071 | 3/1968 | Fuerst | 161/258 |

*Primary Examiner*—Mayer Weinblatt
*Assistant Examiner*—Edith R. Buffalow
*Attorney, Agent, or Firm*—James T. Dunn

[57] ABSTRACT

This invention relates to a decorative plastic laminate preferably one having a high wear resistant decorative surface in which the various layers have controlled wear indices so as to provide the laminate with improved uniform machineable properties.

7 Claims, No Drawings

MACHINEABLE DECORATIVE LAMINATES

BACKGROUND OF THE INVENTION

Decorative laminates have been produced commercially in the United States and other countries of the world for a substantial plurality of years. These decorative laminates contain a plurality of layers that are impregnated with thermosetting resins and are heat and pressure consolidated together to form a unitary structure. The surface sheet is a decorative sheet which is sometimes referred to as a decor sheet which may be a solid color such as a white or a pastel or it may carry a decorative design thereon such as a wood-grain print, floral designs or geometric figures, and the like. The decorative sheet is first impregnated with a noble thermosetting resin which resin is recognized in the laminate industry as one which does not undergo any significant color deterioration during the heat and pressure consolidation step. The thermosetting resin in the decor sheet is converted to the thermoset state during the heat and pressure consolidation step. The decorative sheet containing the noble thermosetting resin, which is preferably a melamine-formaldehyde resin, is then superimposed over one or more core sheets which are generally the kraft paper sheets that have been impregnated with a thermosetting phenol-formaldehyde resin. As before, the thermosetting phenolic resin is converted to the thermoset state during the heat and pressure consolidation step. The number of core sheets used in the laminate may be varied substantially depending on the thickness of the laminate ultimately desired. When extremely thin laminates are desired only one or two core sheets are used. On the other hand, it is frequently desired to make laminates that are one thirty-second inch, one-sixteenth inch or one-eighth inch in thickness; or if desired, they may be made in even greater thicknesses. Accordingly, the thicker laminates require the use of the total number of core sheets varying between about three, five, seven, nine or more. If desired and particularly when the decorative sheet is a printed design, one may superimpose over the decorative sheet an unpigmented overlay sheet which is generally a fine quality alpha-cellulose paper sheet impregnated with a noble thermosetting resin preferably of the same type that is used to impregnate the decorative sheet. After the heat and pressure consolidation step is completed, the overlay sheet becomes transparentized during the consolidation operation so that the decorative sheet can readily be seen through the overlay sheet. Some other protective overlay sheets have been used such as films of polyester resins and films of polyvinyl fluoride and the like. Most of these decorative laminates have found extensive use as horizontal and vertical decorative panels for furniture, kitchen countertops, vanitories, wall siding and the like, by bonding or veneering the laminate with an adhesive material to a rigid support such as particle board or plywood and then fabricating or machining the edges of the veneered assembly with tools common to the wood working industry such as saws, drills, shapers and routers. These tools are generally made of steel, although certain of them, especially those having knife blades are composed of tungsten carbide because the steel tools will show a wear rate much faster than would be expected when compared with the wear rate of the tungsten carbide. When these tools are used to fabricate or machine the edges of the veneered assembly containing the decorative laminate, the operation must be stopped when any significant chipping is observed which indicates that the blade has suffered some significant wear which requires that the blades and other cutting edges be resharpened so as to remove the worn edge.

FIELD OF THE INVENTION

This invention is in the field of decorative plastic laminates which are so constructed as to provide improved uniform machineable properties. More particularly, this invention is directed to decorative plastic laminates that are produced by heat and pressure consolidating to a unitary structure, a plurality of layers of paper arranged in a superimposed assembly wherein the various layers have a controlled wear index depending whether they are in the core portion, the decor portion or the overlay portion and wherein the total quantity of those layers having unduly high wear index features do no constitute more than 5% of the total thickness of the laminate. We have discovered certain novel means for producing decorative laminates which are especially adapted to these machining operations but which yet preserve all of the desirable features of high pressure decorative laminates and which may additionally have especially good resistance to abrasive wear. These novel discoveries were preceeded by certain systematic studies which made the inventive concepts possible. It has been stated hereinabove, that the decorative laminates with which the present invention is concerned have become widely accepted for use in the manufacture of furniture for living rooms and dining rooms. The material is especially useful in table tops because of its resistance to wear, scratching and staining, and it is often more plentiful than the fine wood veneers which it often replaces. In using these decorative laminates in the manufacture of furniture, it is frequently necessary to finish the edges with some ornate or complex geometrical shape which is usually referred to as an "ogee" edge. These contours must be sharply defined or "crisp" as the effect is sometimes called. For economic reasons, it must be generated by a single accurate machining operation without follow-up by additional costly sanding, routing, etc. The machine used to produce such an edge is called a shaper, a device that has been known for many years. The cutting blades on the shaper head are usually of tungsten carbide to provide long life before resharpening becomes necessary. Frequent resharpening leads to "down-time" and reduces the life of the tool since some of it is irretrievably ground away with each resharpening.

Another popular use of decorative laminates in general, is for the surfaces of doors that are used for kitchen cabinets and doors for rooms in homes and offices. The doors are usually cut from flat panel stock on a well-known device called a double-edge tenoner. Again, it is essential for the edge to be cut sharply and "crisply" in a single critical pass through the machine. The cutting tool on a tenoner is essentially a saw blade again fitted with tungsten carbide teeth. For the same reasons as given below, the users of such machines wish to have long, uninterrupted runs.

For many years, furniture manufacturers have observed that some lots of laminates machine well while others machine poorly. This condition is known as "poor machine-ability" and has puzzled both laminate and furniture manufacturers for many years since it manifests itself by the rather sudden appearance of chipping along the edge being machined. Typically, the chipping is not observed at the outset with a new tool or one which has just been resharpened. However, after machining about 50 feet of a table edge containing a laminate which machines poorly, the chipping appears and continues to worsen until the tool is resharpened; this must be done promptly or the chips will soon cause irreparable damage to the piece being machined.

Since it was considered that such mild materials as paper fiber, phenolic resins and melamine resins could hardly be expected to attack tungsten carbide tools, the tools themselves were suspected to be of inferior composition or design. Careful application of the most modern tooling techniques by the tool manufacturers showed that the fault had to lie elsewhere. Certain people in the field believed that "hard" or brittle laminates resulting from over cure of the resins or excess amounts of resin were the cause of this chipping. Others were convinced that feed rates, and tool geometry among other things were to blame for the chipping. In the use of tools made of steel, rather than tungsten carbide, it was observed that the wear rate was much faster, as would be expected. Since the steel tools wore over 200 times faster, one could readily examine the effect of particular laminates upon tool wear much more readily. By measuring the depth of the wear scar left on the tool after only a few feet of cutting a "wear index" could be established which gave a measure of the abrasive attack of the laminate upon the tool. Those laminates which attacked the tool rapidly were said to be "aggressive". Those laminates which attacked the tool very slowly were classified as "non-aggressive". This approach has occurred to other investigators. Reference is made to the article entitled "A Quantitative Study of Some Factors Affecting the Abrasiveness of Particle Board" in the Forest Products Journal, Vol. 21, No. 11, pages 39–41, November 1971 by R. R. Bridges. By standardizing the tools and the method of machining, it was possible to devise a test which would rank the aggressiveness of each laminate constituent and hence could establish its individual contribution to tool wear.

Many laminates are manufactured in so-called "solid colors" "plain colors" which have no pattern or printed design thereon whatever. The decorative effect of such a laminate consists simply of the same color uniformly present over the entire visable surface of the laminate. When such a laminate is tested for abrasion resistance, the end point occurs when the tester is able to see a substantial amount of the dark color core stock through the laminate surface which has been worn away during the test. The most popular solid color in these laminates is white. However, slight variations from white which are tints, otherwise known as pastels, produce light tans, beige, light yellows, pale greens, light pink and the like. These pastels may be considered "white-like" for the purposes of identification. All of the above "whites" and pastel laminates employ substantial quantities of white pigment in the decor paper. The preferred pigment is titanium dioxide because of its great hiding power and purity of color. Titanium dioxide has supplanted zinc sulfide for this use, the latter having been widely used about thirty years ago. A particular problem arises, however, from the use of titanium dioxide as a pigment in a laminate which is to be machined because the $TiO_2$ itself happens to be a rather abrasive substance. Therefore, white and pastel laminates would be expected to show more tool wear than many other colors. Many complaints have been received from furniture manufacturers about the machine-ability of white laminates. In order to make an appraisal of these laminates, a test was set up in which there was utilized a Whitney shaper, a Holz-Her feed attachment, a Leitz cutter head with a 1 inch I. D. adapter equipped with Leitz high speed steel knives with a 45° sharpening angle. The laminate to be tested for wear index was fed into the machine for a fixed distance and the steel knife was removed from the cutter head and inspected under a microscope, the depth of the scar caused by the decor sheet on the blade edge was measured and estimated to the nearest 0.0001 inch. The value of the depth of the decor scar is recorded in mils and is estimated to 0.1 mil as the wear index. Since the decor sheet contains pigment, whereas the overlay sheet and core sheets do not contain pigment, the decor sheet imparts wear to the cutting blade more quickly than the other two unpigmented types of layers. The definition of the decor wear index is the depth in mils of wear scars imparted to a steel cutting blade edge by subjecting the blade to cutting 5 linear feet of a laminate composed only of the decor stock. The core wear index is the depth in mils of wear imparted to a steel cutting blade edge by subjecting said blade edge to cutting twenty-five linear feet of a laminate composed only of the core stock. The sams is true for the overlay. The overlay wear index is also the depth in mils of wear imparted to a steel cutting blade edge by subjecting said blade edge to cutting 25 linear feet of a laminate composed only of the overlay stock.

After having conducted a substantial plurality of tests on different laminates prepared especially for the testing purpose, it was found that the pigments in the decor sheet were in fact responsible for a large measure of wear in this portion of the laminate. This is not particularly surprising but the difference in the aggressiveness of the pigments was larger than anticipated. Wear indices as low as 2 and as high as 15 were observed. It became clear that not all pigments were alike. On the other hand, the kraft papers were likewise found to be different showing core wear indices as low as 4 and as high as 28. It has already been pointed out that the wear index for the core stock and the decor sheets are not the same, although the range of numerical values for both types of paper happens to be close to the same. Nevertheless, the wear index for the decor sheets will be identified as the decor wear index, whereas the wear index for the core layers and for the overlay layers wll be identified as the core wear index and the overlay wear index respectively.

SUMMARY OF THE INVENTION

This invention relates to a decorative plastic laminate, provided with improved uniform machineable properties, comprising the heat and pressure consolidated and cured unitary structure of an assembly of superimposed layers comprising:

a. a core portion of unpigmented kraft paper sheets impregnated with a thermosetting phenol-formaldehyde resin, said core portion having a core wear index of between about 3 to about 10, b. at least one white or pastel opaque pigmented alpha-cellulose decorative paper layer impregnated with a thermosetting melamine-formaldehyde resin, having a decor wear index of between about 2 to about 7, c. wherein the pigmented layers having a decor wear index greater than seven or non-pigmented layers having a core wear index greater than 10 are present in such a total quantity that they constitute not more than 5% of the total thickness of the laminate.

Still further, this invention relates to a decorative plastic laminate of the class just described in which an overlay sheet is positioned on top of the decor sheet and in the course of the laminate manufacture the entire assembly is heat and pressure consolidated to a unitary structure. The overlay sheet is comprised of an unpigmented alpha-cellulose paper layer impregnated with a thermosetting melamine-formaldehyde resin, said sheet having a overlay wear index of not more than 2. Still further, this invention relates to laminates which have an abrasion resistant surface which has been accomplished by incorporating into the surface of the laminate small parts of silica flour.

In order that the concept of the present invention may be more completely understood, the following examples are set forth which show the score on the tool wear tests actually are related to machining performance in field operations.

EXAMPLE 1

A plurality of laminates measuring 4 feet × 10 feet × 1/16 inch consisting of an overlay sheet, a print sheet and a plurality of core sheets were prepared in the usual commercial fashion. In one set of these laminates the decor sheet had a decor wear index of 7.5 while the core stock had a core wear index of 12 when tested according to the method set forth hereinabove. Another set of laminates was composed of decor sheets having a decor wear index of 5.0 and core stock sheets having a core stock wear index of 5.5. These laminates were shipped to commercial furniture manufacturers for trial. In one instance, the laminates were applied to table tops which were 48 inches in diameter and were fitted with maple lumber edges 11/18 inch thick. A tungsten carbide tool cut an ogee edge around the circumference of the table top on an automatic shaping machine. The tops consisted of two semi-circles; one half top was cut at a time. Using the first set of laminates, the newly sharpened cutter became dull after completing six half-tops; machining was stopped because of the chipping resulting from the dull cutter. The cutter was resharpened and used to machine half-tops prepared from the second set of laminates. 150 half-tops were machined from the second set of laminates having no chips and exhibiting sharp crisp edges. The second trial was then discontinued for lack of further quantity of the second type of laminate. The cutter was not in need of sharpening at the end of the second run.

Another shipment of these laminates was made to another manufacturer of tables, who prepared therefrom panels measuring 48 inches × 12 inches × 7/8 inch by adhering these laminates to ¾ inch particleboard. The panels were hand fed against a newly sharpened tungsten carbide cutter to produce an ogee edge. Repeated cuts, which removed 1 inch of material per cut, were made to simulate actual production operation. After 100 feet of cutting, the first laminated material dulled the tool and produced chipping. The tool was resharpened and the second class of laminates were run for 650 feet without exhibiting chipping. The trial was discontinued but only due to lack of further group 2 material. The tool was not in need of sharpening. The above examples show that the two wear index tests correlate well with actual experience. However, these examples did not show the relative importance of the wear contribution made by the core sheets and the print sheets. Accordingly, the following example was performed.

EXAMPLE 2

Aggressive print sheets having a decor wear index of 10.0 and aggressive core stock having a core wear index of 28.0 were selected along with mild print sheets having a decor wear index of 5.0 and mild core sheets also having a core wear index of 5.0. Laminates of 1/16 inch thickness were made of the following combinations and mounted on ¾ inch particleboard and machined with tungsten carbide cutters. The assemblies and the distance to first chip are set forth in the following table:

TABLE I

| No. | Print | Core | Distance to First Chip |
|---|---|---|---|
| 1 | Aggressive | Non-Aggressive | 38 ft. |
| 2 | Non-Agressive | Non-Aggressive | 50 ft. |
| 3 | Aggressive | Aggressive | 4 ft. |
| 4 | Non-Aggressive | Aggressive | 4 ft. |

The results of these experiments show clearly that the presence of aggressive core stock is quite harmful, since laminates 3 and 4 produced chipping much sooner than laminates 1 and 2. The aggressive print sheet was worse than the non-aggressive print sheet but not greatly so when the mild core stock is used. This result was most unexpected since the core stock contains only about 0.04% of silica as its active component. The presence of the silica is evidently due to incomplete washing of the kraft fiber furnish. The active aggressive ingredient in the decor sheet is the pigment, which will be present to an amount of at least about 10% and often over 20%. This shows that not only the wear index of each constituent of the laminate is important, but that its relative total abundance in the laminate is also important. In a 1/16 inch laminate about 10% of the thickness is decor sheet and about 90% is core sheet. In actual practice it was found that the mild core stock improved the performance of the laminate greatly, even if combined with relatively aggressive decor sheet having a decor wear index of 10–12. Of course, mild decor sheet having a wear index of about 5.0 gave even better performance, but about 80% of the improvement was due to the core stock.

EXAMPLE 3

The use of abrasive loaded overlay sheets to enhance wear resistance of laminates has been disclosed in the U.S. Pat. Nos. 3,373,070 and 3,373,071 and the earlier U.S. Pat. No. 3,135,643. Each of these patents is incorporated herein by reference. In making the present study, it was feared that such overlays would attack cutting tools severely and prohibit their use on machineable laminates. In order to either confirm these fears or surmount them, a laminate was prepared in which a single sheet of 20 lb./ream overlay paper containing 1% of finely divided silica was used wherein said overlay sheet had a decor wear index of 19.0. This scale was purposely used in anticipation of an extremely high value. This overlay sheet had been preimpregnated with a melamine-formaldehyde resin and the process of imparting the finely divided silica to the overlay sheet is shown in the U.S. Pat. No. 3,373,070. A single sheet of decorative paper which had been preimpregnated wit a melamine-formaldehyde thermosetting resin of 90 lb./ream basis weight and having a decor wear index value of 2.0 together with seven sheets of kraft paper that had been preimpregnated with a thermosetting phenol-formaldehyde resin and having a basis of 126 lbs./ream and a core wear index of 5.0 were assembled in superimposed relationship and the assembly was heat and pressure consolidated to a unitary structure. It is understood that a basis weight of a particular type of paper is the weight of a ream of said paper mounting to 500 sheets thereof that measure 24 inches × 36 inches each (i.e. 3,000 sq. ft.). Another laminate identical with the one prepared immediately hereinabove was also prepared except that the overlay sheet was a 28 lb./ream paper having no silica therein but having been preimpregnated with a thermosetting melamine-formaldehyde resin having an overlay wear index of less than 1. The laminates were machined with tungsten carbide tipped cutters on a conventional wood shaper. No difference in tool wear or onset of chipping was noticeable. The very high wear index of the overlay in the first sheet is counter balanced by its very small proportion relative to the entire laminate. The overlay wear index of the second overlay sheets is less than 1.0. This indicates that certain limited layers of paper can be used which have relatively high wear indices provided that in the total laminate, the pigmented layer having a decor wear index greater than 7 or a non-pigmented component having a core wear index or a overlay wear index greater than 10 may be present but in such a total quantity that it constitutes not more than about 5% of the total thickness of the laminate. It is the very small proportion of the total laminate thickness which contains the aggressive layer (only about 3% of the 1/16 inch laminate is made up of the overlay region). This further establishes that not only wear index but thickness fraction is important in tool wear. This novel and unexpected observation constitutes an important part of the present invention.

A second aspect of the present invention is related to the abrasion resistance of the laminate itself. This property is generally measured by rotating a specimen against a standard sandpaper as described in NEMA Standards, Pub. No. LD-1-1971.

After the studies had been completed, the manufacturers of white decor paper were made aware of these findings and they requested to supply white and pastel papers with the lowest possible wear index. The papers were supplied in hand sheet form which were tested for wear index and color in the research laboratories. When a suitable formulation was accomplished, that paper was ordered in commercial quantities and was then converted to full scale white or pastel laminates without overlay. It is sometimes desirable to make use of two white or pastel papers as decor papers in producing a white or pastel laminate. A typical assembly is prepared as follows: an assembly is prepared of a plurality of layers reading from top to bottom of a white top sheet consisting of an alpha-cellulose paper containing from about 10% to about 25% of titanium dioxide pigment wherein the paper had a basis weight from about 50 lb./ream to about 90 lb./ream. The top sheet had been preimpregnated with a thermosetting melamine-formaldehyde resin. Under the top sheet is positioned a barrier layer which is a white sub-sheet consisting of similar alpha-cellulose paper but containing only about 3% to about 6% of titanium dioxide pigment. Other less opaque pigments such as blanc fixe (barium sulfate) may be present up to a total ash content of about 10%. This is often called a barrier layer since it will help to hide the dark color of the core layers below. Below this barrier sheet is positioned a plurality of phenolic resin impregnated kraft core sheets in sufficient number to produce the desired thickness, namely from about 2 to about 9 core sheets.

EXAMPLE 4

Commercial quantities of alpha-cellulose paper sheets containing the amount of $TiO_2$ described hereinabove were secured to act as a top sheet and having a decor wear index of 1.7. At the same time, the barrier sheet was obtained suitable for sub-sheet use having a decor wear index of about 5.5. The core wear index of the phenolic kraft core sheets hereinabove is 7.0. The assembly of these paper sheets were converted to commercial size laminates 4 feet × 10 feet × 1/16 inch in a well known manner using the assembly with the sub-sheet described above. The material thus produced as sent to a commercial kitchen cabinet manufacturer who produced cabinet doors from them on a double end tenoner. The manufacturer reported that the distance cut before adjustment was needed increased from 45 ft. to more than 225 ft. This was considered to be superior performance for white-like laminates.

The laminates in Example 4 were found to have a NEMA abrasion value of only 465 cycles. The minimum standard NEMA requirement is 400 cycles. It should be noted, however, that the NEMA abrasion resistance, like all other physical properties, is subject to small variations due to random process fluctuations. For many years, it has been practice to control such variables by statistical procedures which are obtained in the body of knowledge known as Industrial Quality Control. In order to be certain of a 95% compliance with standards, it is generally desirable to set the average value of the property in question at a point which is two standard deviations above the minimum permissible. These limits are often called "20-limits". In the case of abrasion resistance, it is generally desirable to set the average value at 530 cycles in order to be assured that no individual value falls below 400 cycles. Thus, the reduction in abrasive character of the top decor sheet made it less able to resist the attack of the sandpaper used in the NEMA test. It should be noted, however, that this condition applied only to the top decor sheet and not to the white sub-sheet or barrier layer. Since the barrier layer need not resist abrasive wear, in the manner of the top sheet, it can be as non-aggressive as possible and still fill its barrier function without degrading machineability.

EXAMPLE 5

A paper manufacturer was requested to supply white titanium dioxide-bearing surface sheets over a range of decor wear indices. These sheets were converted into white laminates with barrier sheets and tested for both wear index and NEMA abrasion resistance. It was found that one unit on the decor wear index scale corresponds to 15 cycles of NEMA abrasion. When the decor wear index value declined over an 8 unit range, namely from about 10 down to about 2, the abrasion resistance declined by about 120 cycles. With this knowledge, it was possible to calculate the level of decor wear index necessary to increase the abrasion resistance from 465 to the desired 530 cycles. This increase is 65/15 or 4.3 units. When added to the 1.7 already existing in the white decor sheet, the appropriate level of 6.0 is found for the decor wear index. Addition studies show that the paper mills could control this within ± 1.0 unit. Hence, decor wear index should be 6.0 ± 1.0 unit. Meanwhile, a white barrier sheet was obtained that had a decor wear index of 2.3. A laminate was prepared from the following construction: one white decor sheet, 90 lb./ream decor wear index of 6.0, a white barrier sheet, 103 lb./ream with a decor wear index of 2.3 and seven sheets of kraft paper, 123 lb./ream, core wear index of 5.0 Each of these paper sheets had been previously preimpregnated with suitable melamine or phenolic resins and the entire assembly consolidated to a unitary structure in the conventional manner. The laminate machined as well as that of Example 4, but the abrasion resistance was now up to 530 cycles.

EXAMPLE 6

Example 5 was repeated in all essential details except that a 123 lb./ream paper was substituted for the 90 lb. decor paper. Because of the greater thickness of the decor paper, more material can be worn away before the core "show-through" produces failure. The 120 lb./ream paper at at 8.5 decor wear index yields 14% more wear cycles than the 90 lb./ream paper. This is equal to 595 cycles which is 65 cycles in excess of that needed in Example 5. Hence, the wear index of 120 lb. paper need only be 8.5 − 65/15 or 4.2. A laminate made with such a decor sheet (120 lbs./ream having a 4.2 decor wear index had an abrasion resistance of 510 cycles and machined without causing excessive tool wear.

EXAMPLE 7

A 90 lb./ream white decor paper with a decor wear index of 2.0 was impregnated with a melamine-formaldehyde resin and then overcoated with fine silica, paper floc and the melamine resin in the manner of Michl, U.S. Pat. No. 3,135,643, Example 1, with a dry coating weight of 0.30 lb./sq. ft. The resulting laminate surfaced from said white decor paper had an abrasion resistance of 510 cycles and showed no excessive wear on a tungsten carbide tipped shaper cutter. Thus, attack on the tool is again reduced due to the very thin layer which contains the abrasive element.

EXAMPLE 8

A decorative laminate was prepared from the following components arranged in superimposed relationship:
1. One sheet of 28 lb./ream overlay paper impregnated only with a melamine-formaldehyde thermosetting resin, in a well known fashion and free of abrasives or other inclusions and having an overlay wear index less than 1.0.
2. A 90 lb./ream decor sheet impregnated with a thermosetting melamine-formaldehyde resin and having a decor wear index of 2.0.
3. A 102 lb. barrier sheet with a decor wear index of 2.0.
4. Seven sheets of kraft-phenolic resin impregnated core stock having a core wear index of 5.0.

The above laminate machined well without excessive tool wear because there is no component of high wear index contained in it. The abrasion resistance was 980 cycles due to the presence of both a standard overlay and the white decor sheet.

EXAMPLE 9

As indicated in Example 6, a 123 lb./ream white decor sheet with a decor wear index of 8.5 and backed up with a 103 lb./ream barrier produced an abrasion resistance of about 600 cycles in a 1/16 inch laminate. An identical laminate was made but without the 103 lb./ream barrier. The color shifted perceptibly to an off-white due to the show-through of the core. For the same reason, the endpoint on the abrasion test was reached sooner so that only 495 cycles were obtained for abrasion resistance. The machineability of the laminate was poor and produced chipping after 100 ft. of cutting with a tungsten carbide shaper blade. A similar laminate which was only 1/32 inch thick produced failure by chipping after only 50 ft. This is due to the fact that the aggressive layer, namely the white decor sheet, is a larger proportion of the total thickness. Since the abrasion resistance was already marginal, it was not possible to reduce the decor wear index in order to improve machineability.

From the above examples and the discussions thereof, it should be clear that procedures can be used whereby a white or pastel decorative plastic laminate can be constructed so that each layer in the assembly is optimized with respect to wear resistance and non-aggressive behavior toward tools by the proper selection of papers having suitable wear indices and the adjustment of the fraction of the total laminate thickness occupied by each layer.

The instant Applicants have established that there is a relationship between the abrasiveness of the components and the fraction of the laminate which they comprise. For instance, only 0.4% of the silica in the core stock (90% of the thickness of the laminate) is as damaging as 25% $TiO_2$ in the decor layer (10% of the thickness of the laminate). Much higher silica content, namely about 1.0% in an overlay sheet is not damaging because that layer is so thin.

We claim:
1. A decorative plastic laminate, provided with improved uniform machineable properties, comprising the heat and pressure consolidated and cured unitary structure of an assembly of superimposed layers comprising:
    a. a core portion of unpigmented kraft paper sheets impregnated with a thermosetting phenol-formaldehyde resin, said core portion having a core tool wear index of between about 3 to about 10,
    b. at least one white or pastel opaque pigmented alpha-cellulose decorative paper layer impregnated with a thermosetting melamine-formaldehyde resin, having a decor tool wear index of between about 2 to about 7,
    c. wherein the pigmented layers having a decor tool wear index greater than 7 or non-pigmented layers having a core tool wear index greater than 10 are present in such a total quantity that they constitute not more than 5% of the total thickness of the laminate.
2. A decorative plastic laminate according to claim 1 in which the decor sheet is covered with an overlay sheet, said overlay sheet is comprised of an unpig- mented alpha-cellulose paper layer impregnated with a thermosetting melamine-formaldehyde resin, said overlay sheet having an overlay tool wear index of not more than about 2.

3. A decorative plastic laminate according to claim 1 in which there is used two white or pastel opaque pigmented alpha-cellulose decorative paper layers that are impregnated with a thermosetting melamine-formaldehyde resin, each having a decor tool wear index of between about 2 to about 7.

4. A decorative plastic laminate according to claim 1 in which the decorative paper layer contains small quantities of finely divided silica flour which imparts to the laminate a high wear resistant surface characteristic.

5. A decorative plastic laminate according to claim 2 in which the overlay sheet has in its surface small quantities of silica flour which imparts to the laminate a high wear resistant surface characteristic.

6. A decorative plastic laminate according to claim 1 in which the decorative paper layer has imprinted thereon a decorative design and in which said decorative paper layer is covered with an overlay sheet, said overlay sheet is comprised of an unpigmented alpha-cellulose paper layer impregnated with a thermosetting melamine-formaldehyde resin, said overlay sheet having an overlay tool wear index of not more than about 2.

7. A decorative plastic laminate, provided with improved uniform machineable properties, comprising the heat and pressure consolidated and cured unitary structure of an assembly of superimposed layers comprising:
   a. a core portion of unpigmented kraft paper sheets impregnated with a thermosetting phenol-formaldehyde resin, said core portion having a core tool wear index of between about 3 to about 10,
   b. an alpha-cellulose decorative paper layer having imprinted thereon a decorative design, impregnated with a thermosetting melamine-formaldehyde resin, having a decor tool wear index of between about 2 to about 7, said printed decorative paper layer is covered with an overlay sheet, said overlay sheet is comprised of an unpigmented alpha-cellulose paper layer impregnated with a thermosetting melamine-formaldehyde resin, said overlay sheet having an overlay tool wear index of not more than about 2,
   c. wherein the pigmented layers having a decor tool wear index greater than 7 or non-pigmented layers having a core tool wear index greater than 10 are present in such a total quantity that they constitute not more than 5% of the total thickness of the laminate.

* * * * *